Patented Feb. 14, 1939

2,147,545

UNITED STATES PATENT OFFICE 2,147,545

MINERAL OIL PRODUCT AND METHOD OF MAKING

Orland M. Reiff, Woodbury, N. J., assignor to Socony-Vacuum Oil Company, Incorporated, New York, N. Y., a corporation of New York No Drawing. Application July 21, 1936, Serial No. 91,671

12 Claims. (Cl. 87—9)

This invention relates primarily to an improvement in oils and particularly to the lowering of the temperature at which a hydrocarbon oil comprising a substantially homogeneous mixture of liquid oils and waxy solids undergoes loss of fluidity. Ordinarily, this is referred to as the reduction of the pour point.

This invention relates specifically to pour depressants wherein ester waxes are used in the manufacture of the depressants. Ester waxes are natural products of plant or animal origin, as distinguished from petroleum hydrocarbon waxes. They possess waxy physical properties. The major constituents of ester waxes are esters, and they usually contain excess acids or alcohols. The same or similar products can be synthesized from alcohols and acids. The term "ester waxes" as used herein includes both the natural products and the snythesized products.

The term "ester waxes" as used herein includes esters formed from both monohydric and polyhydric alcohols and fatty acids. Examples of ester waxes formed from monchydric alcohols and fatty acids are montan wax, carnauba wax, candelilla wax, spermacetti, and the like. Ester waxes formed from polyhydric alcohols (such as glycerine) and fatty acids, for example Japan wax, are suitable, and are included within the meaning of the term "ester waxes". Such products are commonly classified as fats (glycerides), but are esters and ester waxes in the sense used herein. The class of ester waxes as defined above is suitable for the uses of this invention.

Pour depressants are produced in accordance with this invention by chlorinating ester waxes and condensing them with certain aromatic compounds, in the presence of a catalyst such as aluminum chloride. The ester waxes can be chlorinated by bubbling chlorine through them. The chlorinated ester waxes can then be condensed, in the manner above indicated, with, for example, phenol, resorcinol, hydroxydiphenyl, benzyl phenol, or aromatic ethers such as anisole or beta naphthyl methyl ether. In this condensation, the ester constituents of the chlorinated ester waxes condense on to the aromatic compound as substituents.

If the ester waxes contain excess alcohols or acids, alcohols will be condensed on to the aromatic compound by the foregoing procedure with resulting formation of ethers, while the presence of fatty acids will result in formation of esters. It will ordinarily be desirable to purify the ester waxes by removal of free fatty acids, if they are present, before using the ester waxes in the manufacture of depressants in accordance with this invention.

As another embodiment of the invention, oxyaromatic compounds of the class of hydroxyaromatic compounds and aromatic ethers can be condensed with chlorinated ester waxes as aforesaid, and the product thus obtained further condensed with a resinifying agent. Also, hydroxyaromatic compounds or aromatic ethers as aforesaid can first be condensed with a resinifying agent and the product thus obtained condensed with chlorinated ester waxes. Resinifying agents which are suitable comprise any such agent which is capable of resinifying the parent oxyaromatic compound. Examples of suitable resinifying agents are: Those that eliminate halogen hydrides in reaction with the above-defined classes of oxyaromatic hydrocarbons, for example halogenated organic compounds such as halogenated aralkyl or aryl hydrocarbons, for example, benzyl chlorides, chlornaphthalene and chloranthracene; those that eliminate water, such as the aldehydes, particularly the aliphatic aldehydes, ketones, alcohols and polyalcohols, for example formaldehyde, acetaldehyde, butyraldehyde, acetone, butyl alcohol, ethylene glycol and glycerol; sulphur reagents, for example, elementary sulphur and sulphur chlorides, such as sulphur monochloride, which form oxyaromatic hydrocarbon resins with fixation of sulphur and elimination of hydrogen sulphide; oxidizing agents which eliminate nuclear hydrogen, for example, oxygen, potassium permanganate, chlorine and ferric chloride. Of the above-named resinifying agents, formaldehyde, butyraldehyde and sulphur monochloride are at present preferred. Examples of suitable oxyaromatic compounds within the above defined classes are: phenol, benzyl phenol, resorcinol, o-hydroxydiphenyl, B-naphthol, p-cresol, hydroquinone, catechol, xylenol, phenyl ethyl phenol, methyl hydroxydiphenyl, ethyl hydroxydiphenyl, guaiacol, the monoethylether of catechol, methyl naphthol, tolyl naphthol, xylyl naphthol, benzyl naphthol, methoxyhydroxy naphthalene, anthrazole, phenyl methyl anthrazole and the like.

As a further embodiment of the invention, chlorinated ester wax and a hydroxyaromatic compound can be chemically condensed together, and the resulting condensation product then chemically reacted with an acylating agent, preferably an organic acylating agent, such as the chloride or anhydride of an organic carboxylic acid or the acid itself. Examples of suitable oxyaromatic compounds are as already given above.

The organic acylating agents used in the present invention may vary widely in nature. They may for instance correspond to the following: the monocarboxylic saturated, aliphatic acids having molecular weights as low as acetic acid and as high as montanic such for example as acetic, butyric, capric, palmitic, stearic and montanic, corresponding respectively to the acyl radicals acetyl, butyryl, capryl, palmityl, stearoyl and montanyl; unsaturated aliphatic monobasic acids such as acrylic, corresponding to the acyl radical acrylyl; saturated aliphatic polybasic acids such as succinic, oxalic, adipic, sebacic, etc.; unsaturated aliphatic polybasic acids such as fumaric; substituted mono and polybasic aliphatic acids containing halogen, hydroxyl, amino, or keto groups such as chloracetic acid, tartaric acid, and glycollic acid; aromatic monobasic acids such as benzoic and naphthoic; aromatic polybasic acids such as phthalic; alkylene-substituted aromatic monobasic acids such as cinnamic; aryl-substituted mono and polybasic aliphatic acids with COOH in side chain such as xylic, phenylstearic, naphthylstearic and naphthylpolystearic, etc.; substituted aromatic mono and polybasic acids containing halogen, hydroxyl amino, alkyl, aryl, aralykl, keto, nitro or alkoxy in the ring such as chlorbenzoic, salicylic, anthranilic, toluic, phenylbenzoic, nitrobenzoic, anisic and benzoylbenzoic acid; non-benzenoid cyclic mono and polycarboxylic acids such as abietic and camphoric acids and heterocyclic carboxylic acids such as furoic acid. In forming the acid chlorides of the hydroxy and/or amino substituted acids mentioned above it is desirable to first acylate these substituted groups before preparing the corresponding acyl chlorides. Of the above acylating agents those corresponding to benzoic, toluic, etc.; to the dicarboxylic aromatic acids of the class typified by phthalic acid; to acetic, and stearic acids, and to the aliphatic dibasic acids, as adipic, sebacic, and succinic acids yield the better results. In general, preference is for the dibasic acids.

As a still further embodiment, chlorinated ester waxes may be condensed with aryl-aryl, alkyl-aryl, aralkyl-aryl, or aralkyl ethers, in the manner described above, and the product thus obtained reacted with an acylating agent, of the type defined in the preceding paragraph.

I claim:

1. A mineral oil comprising a mixture of liquid mineral oils and waxy hydrocarbons, and having incorporated in it, in small proportion but sufficient to depress the pour point of the oil, the product obtained by chemically condensing chlorinated ester wax with a compound selected from the class consisting of phenol, resorcinol, hydroxy, diphenyl, benzyl phenol, and the aromatic ethers.

2. A mineral oil comprising a mixture of liquid mineral oils and waxy hydrocarbons, and having incorporated in it, in small proportion but sufficient to depress the pour point of the oil, the product obtained by condensing chlorinated ester wax with oxyaromatic compounds selected from the class which consists of the hydroxyaromatic compounds and the aromatic ethers, and then condensing the product thus obtained with a resinifying agent which reacts with an aromatic compound.

3. A mineral oil comprising a mixture of liquid mineral oils and waxy hydrocarbons, and having incorporated in it, in small proportion but sufficient to depress the pour point of the oil, the product obtained by condensing an oxyaromatic compound selected from the class which consists of the hydroxyaromatic compounds and the aromatic ethers with a resinifying agent which reacts with an aromatic compound, and then condensing the product thus obtained with chlorinated ester wax.

4. A mineral oil comprising a mixture of liquid mineral oils and waxy hydrocarbons, and having incorporated in it, in small proportion but sufficient to depress the pour point of the oil, the product obtained by condensing chlorinated ester wax with a hydroxyaromatic compound, and reacting the product thus obtained with an acylating agent.

5. A mineral oil comprising a mixture of liquid mineral oils and waxy hydrocarbons, and having incorporated in it, in small proportion but sufficient to depress the pour point of the oil, the product obtained by condensing an ether selected from the class consisting of aryl-aryl, alkyl-aryl, aralkyl-aryl and aralkyl ethers with chlorinated ester wax, and then reacting the product thus obtained with an acylating agent.

6. The method of producing a lubricant oil of relatively low pour point which comprises chemically condensing chlorinated ester wax with a compound selected from the class consisting of phenol, resorcinol, hydroxy diphenyl, benzyl phenol, and the aromatic ethers, and admixing the reaction product with a mineral lubricant oil of relatively high pour point in small proportion but sufficient to depress the pour point of the said oil.

7. The method of producing a lubricant oil of relatively low pour point which comprises condensing chlorinated ester wax with oxyaromatic compounds selected from the class which consists of the hydroxyaromatic compounds and the aromatic ethers, then condensing the product thus obtained with a resinifying agent which reacts with an aromatic compound, and admixing the reaction product with a mineral lubricant oil of relatively high pour point in small proportion but sufficient to depress the pour point of the said oil.

8. The method of producing a lubricant oil of relatively low pour point which comprises condensing an oxyaromatic compound selected from the class which consists of the hydroxyaromatic compounds and the aromatic ethers with a resinifying agent which reacts with an aromatic compound, then condensing the product thus obtained with chlorinated ester wax, and admixing the reaction product with a mineral lubricant oil of relatively high pour point in small proportion but sufficient to depress the pour point of the said oil.

9. The method of producing a lubricant oil of relatively low pour point which comprises condensing chlorinated ester wax with a hydroxyaromatic compound, reacting the product thus obtained with an acylating agent, and admixing the reaction product with a mineral lubricant oil of relatively high pour point in small proportion but sufficent to depress the pour point of the said oil.

10. The method of producing a lubricant oil of relatively low pour point which comprises condensing an ether selected from the class consisting of aryl-aryl, alkyl-aryl, aralkyl-aryl and aralkyl ethers with chlorinated ester wax, then reacting the product thus obtained with an acylating agent, and admixing the reaction product with a mineral lubricant oil of relatively high pour point in small proportion but sufficient to depress the pour point of the said oil.

11. A mineral oil comprising a mixture of liquid mineral oils and waxy hydrocarbons and having incorporated in it, in small but sufficient proportion to depress the pour point of the oil, the product obtained by separately condensing an oxyaromatic compound, selected from the class which consists of the hydroxyaromatic compounds and the aromatic ethers, with a chlorinated ester wax and a resinifying agent which reacts with an aromatic compound.

12. The method of producing a lubricant oil of relatively low pour point which comprises separately condensing oxyaromatic compounds, selected from the class which consists of the hydroxyaromatic compounds and the aromatic ethers, with a chlorinated ester wax and a resinifying agent which reacts with an aromatic compound, and admixing the reaction product with a mineral lubricant oil of relatively high pour point in small proportion but sufficient to depress the pour point of the said oil.

ORLAND M. REIFF.